(12) United States Patent
Maher et al.

(10) Patent No.: US 7,992,192 B2
(45) Date of Patent: Aug. 2, 2011

(54) ALERTING AS TO DENIAL OF SERVICE ATTACKS

(75) Inventors: Kevin Edward Maher, San Jose, CA (US); Andrew Millard Brown, Mountain View, CA (US)

(73) Assignee: eBay Inc., San Jose, CA (US)

( * ) Notice: Subject to any disclaimer, the term of this patent is extended or adjusted under 35 U.S.C. 154(b) by 1240 days.

(21) Appl. No.: 11/617,974

(22) Filed: Dec. 29, 2006

(65) Prior Publication Data

US 2008/0162679 A1    Jul. 3, 2008

(51) Int. Cl.
*G06F 7/04* (2006.01)
*G08B 23/00* (2006.01)

(52) U.S. Cl. .............................................. 726/3; 726/23
(58) Field of Classification Search ................. 726/3, 23
See application file for complete search history.

(56) References Cited

U.S. PATENT DOCUMENTS

| | | | | |
|---|---|---|---|---|
| 6,965,574 | B1 * | 11/2005 | Cook et al. ..................... | 370/252 |
| 7,363,656 | B2 * | 4/2008 | Weber et al. ..................... | 726/23 |
| 2002/0035683 | A1 * | 3/2002 | Kaashoek et al. ............ | 713/154 |
| 2004/0215976 | A1 * | 10/2004 | Jain ................................ | 713/201 |

OTHER PUBLICATIONS

Haro, F., et al., "Detecting Loss of Performance in Dynamic Bottleneck Capacity (DBCAP) Measurements using the Holt-Winters Algorithm", Stanford Linear Accelerator Center—Last modified Feb. 21, 2005, [Online]. Retrieved from the Internet: <URL: http://www-iepm.slac.stanford.edu/monitoring/forecast/hw.html>, (2005).

Lakhina, Anukool, et al., "Diagnosing Network-Wide Traffic Anomalies", ACM SIGCOMM Computer Communication Review, 34(4), Session: Network troubleshooting, (2004), 219-230.

Liu, Cejun, et al., "Time Series Analysis and Forecast of Annual Crash Fatalities", Research Note—DOT HS 809 717—NCSA, U.S. Department Of Transportation National Highway Traffic Safety Administration, (Mar. 2004).

Phinjaroenphan, Panu, "A Reliability Prediction Algorithm and a Predictor", [Online]. Retrieved from the Internet: <URL: http://goanna.cs.rmit.edu.au/~pphinjar/GMap/predictor.pdf>, (Last update Jul. 30, 2006), 64-86.

* cited by examiner

*Primary Examiner* — Kambiz Zand
*Assistant Examiner* — William S Powers
(74) *Attorney, Agent, or Firm* — Schwegman, Lundberg & Woessner, P.A.

(57) ABSTRACT

A method and a system, wherein the system comprises a first server operatively coupled to a router, to receive a copy of network traffic processed by the router, a database operatively coupled to the first server, wherein the server records parsed network traffic information onto the database, and a device operatively coupled to the first server to receive alerts regarding possible denial-of-service attacks, the alerts based upon network traffic falling outside a standard deviation range. A method that comprises receiving a data packet from a network, parsing the data packet, storing data in the fields of the data packet into a database, comparing observed data set values with a historical data set values, sending an alert to a device based upon network traffic falling outside a standard deviation range, and updating the historical data set values by averaging the observed data set values with an old historical data set values.

20 Claims, 15 Drawing Sheets

ALERTING AS TO DENIAL OF SERVICE ATTACKS

TECHNICAL FIELD

The present application relates generally to the technical field of algorithms and programming and, in one specific example, to the use of quantitative forecasting algorithms to determine network traffic.

BACKGROUND

DOS attacks can come in many forms. As the name suggests, a DOS attack renders a network, host, or other piece of network infrastructure unusable by legitimate users. Typically, a DOS attack works by creating so much work for the infrastructure under attack that legitimate work cannot be performed. In a Synchronize (SYN) flooding attack, the attacker deluges a server with Transmission Control Protocol (TCP) SYN packets, each having a spoofed Internet Protocol (IP) source address. The server, not being able to differentiate between a legitimate SYN and a spoofed SYN, completes the second step of the TCP handshake for a spoofed SYN, allocating data structures and state. The third step of the three-way handshake is never completed by the attacker, leaving an ever-increasing number of partially open connections. The load of SYN packets to be processed and depletion of free memory eventually crashes the server. A related form of attack sends IP fragments to a host but never sends enough fragments to complete a datagram. The attacked host continues to accumulate fragments, waiting in vain for fragments that would complete a datagram, consuming an ever-increasing amount of storage over time. A smurf attack operates by having a large number of innocent hosts respond to Internet Control Message Protocol (ICMP) echo-request packets that contain a spoofed source IP address. This results in a large number of ICMP echo-reply packets being sent to the host whose IP address is being spoofed.

In a Distributed Denial-Of-Service (DDOS) attack, the attacker first gains access to user accounts on numerous hosts across the Internet (for example, by sniffing passwords or by otherwise breaking into a user's account). The attacker then installs and runs a slave program at each compromised site that quietly waits for commands from a master program. With a large number of such slave programs running, the master program then contacts the slave programs, instructing each of them to launch a denial-of-service attack directed at the same target host. The resulting coordinated attack is particularly devastating, since it is coming from so many attacking hosts at the same time.

BRIEF DESCRIPTION OF THE DRAWINGS

Some embodiments are illustrated by way of example and not limited in the figures of the accompanying drawings in which.

DETAILED DESCRIPTION

Example methods and systems to enhance fraud detection are described. In the following description, for purposes of explanation, numerous specific details are set forth in order to provide a thorough understanding of example embodiments. It may be evident, however, to one skilled in the art, that the present invention may be practiced without these specific details.

Figure 1:
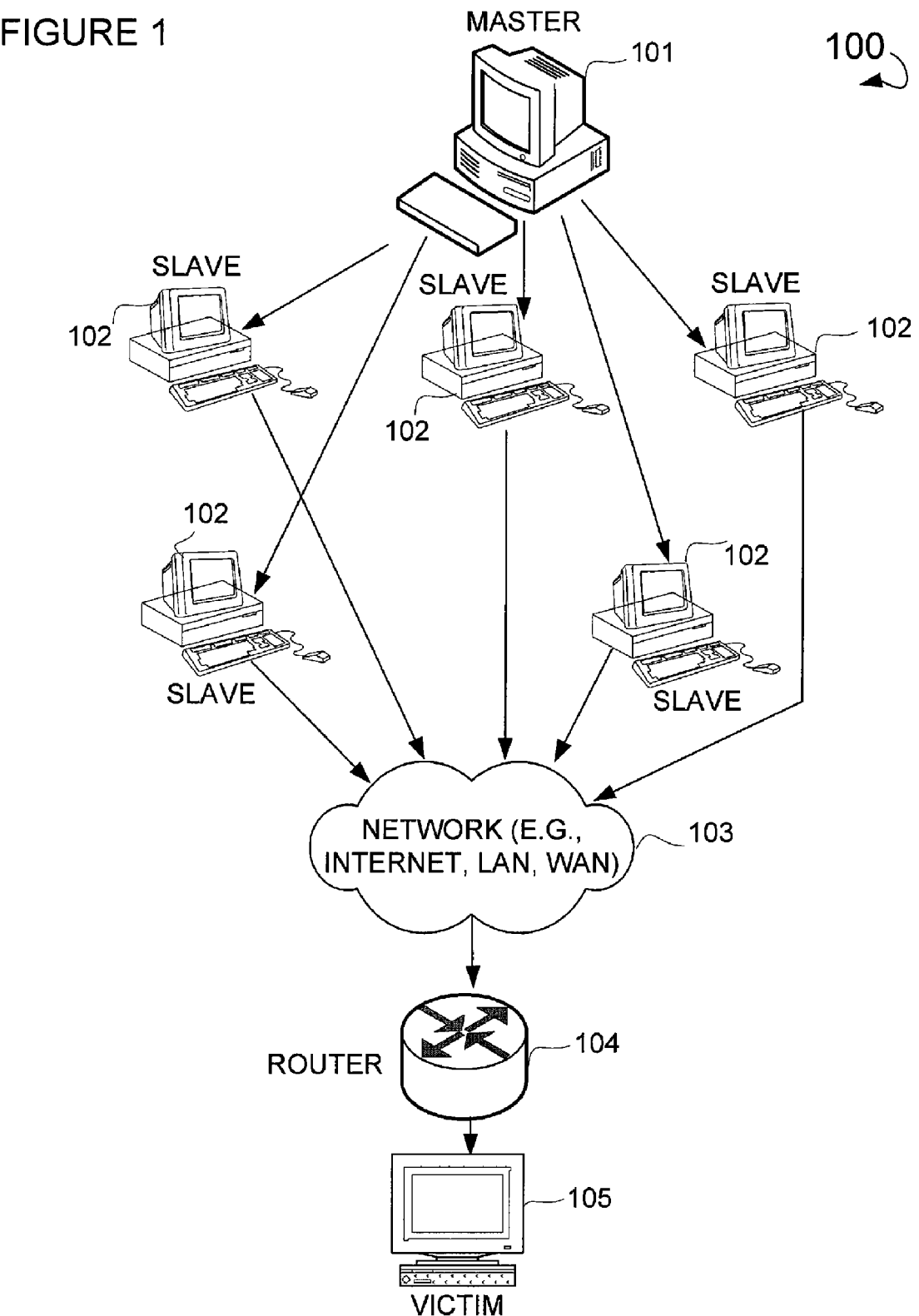
FIG. 1 is an example block diagram illustrating a system being subjected to a DDOS attack.

FIG. 1 is an example block diagram illustrating a system 100 being subjected to a DDOS attack. In some embodiments, a master computer 101 that is operatively coupled to various other slave computers engages in a DDOS attack. This attack can be facilitated by various applications being covertly or surreptitiously placed on the various slave computer systems 102. Once placed on these slave computers 102, the applications are then used to initiate a DDOS attack. The master computer 101 serves to initiate the attack and/or coordinate or direct the attack. Described in FIG. 1 is a master computer 101 operatively coupled to various slave computers 102. These slave computers systems 102 and the master computer 101 are, in turn, operatively coupled to a router 104 via a network 103. Once the DDOS attack is initiated, various types of messages may be sent from the slaves 102 to the router 104 in an attempt to overload the router and/or computers operatively coupled to the router 104, such as, for example, a victim 105. This victim 105 may be a web server, application server, router, or computer system. The purpose is to overload the router 104 or victim 105 such that the victim then crashes, or, more to the point, so that the operating system run by the router 104, or victim 105 crashes causing a complete system failure. In some cases, once the system crashed, an automatic re-boot of the system may occur without any of the security settings existing prior to the crash.

Example Implementation Detecting a DDOS Attack

Figure 2:
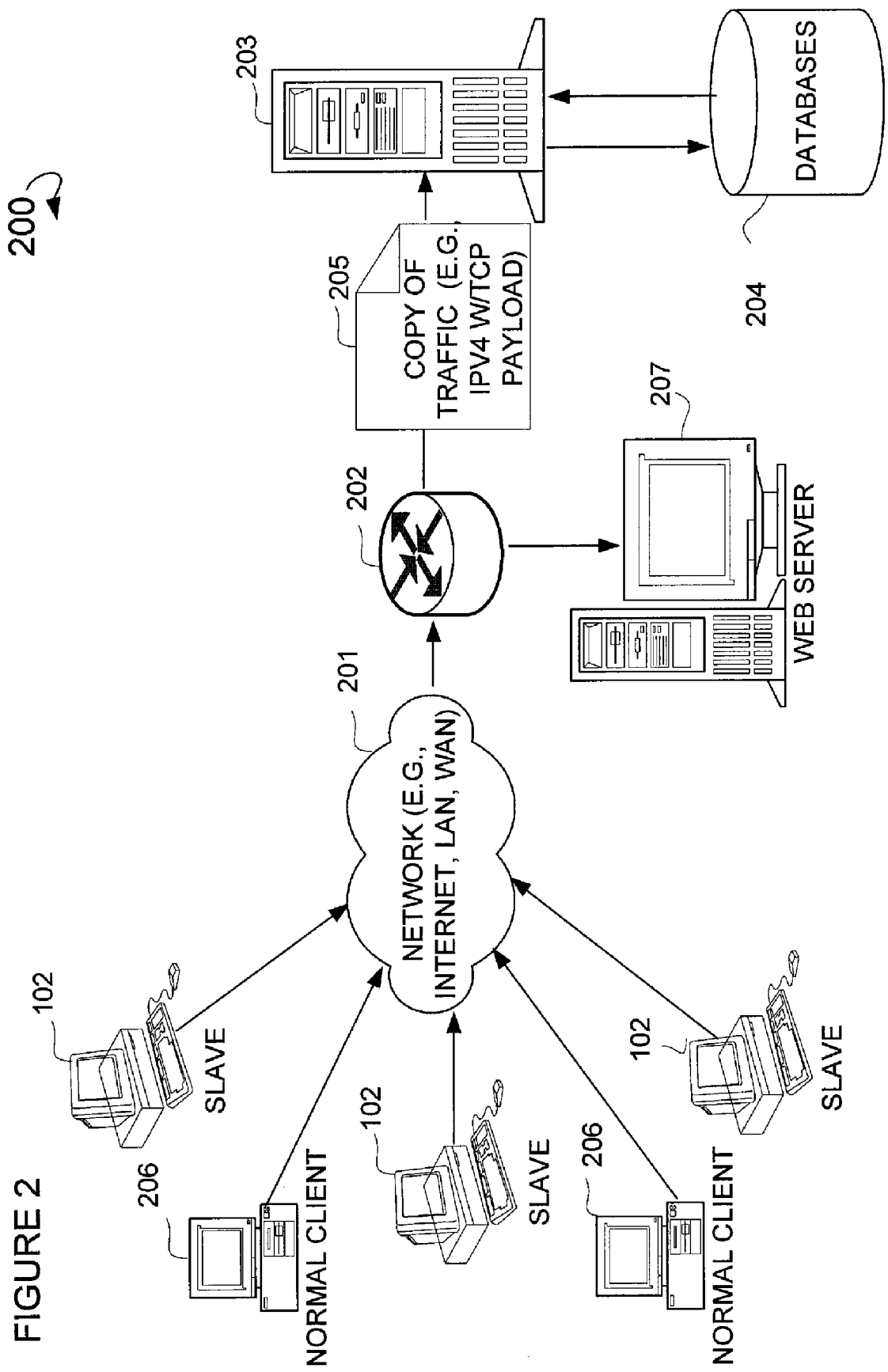
FIG. 2 is an example block diagram illustrating a system being subjected to a DDOS attack

FIG. 2 is an example block diagram illustrating a system 200 being subjected to a DDOS attack. In some embodiments, a router 202 may receive network traffic from a slave 102 and/or from a normal client 206. The slaves 102 are operatively coupled via a network connection 201 and to the router 202, as are the normal clients 206. In some embodiments, a copy of traffic file 205 is sent from the router 202 to a server 203. This copy of traffic file 205 records all traffic for a specified time period between the router 202 and, for example, a web server 207 that is operatively coupled to the router 202. In some cases, this web server 207 could be a victim of a distributed denial of service attack or some other type of denial service attack (see above). For example, if a number of slaves 102 were to conduct a DDOS attack on the web server 207, then it would be by way of the router 202. This copy of traffic file 205 is sent to a server 203 which, in turn, stores this copy of traffic file 205 into a database 204. In some embodiments, traffic from a slave 102 and normal client 206 can be distinguished based upon the fields contained within data packets and abnormal amounts (e.g., amounts exceeding a range of standard deviation values) of data packet traffic crossing a network 201 containing data related to specific fields and ranges of values with these fields and data packets.

Figure 3:
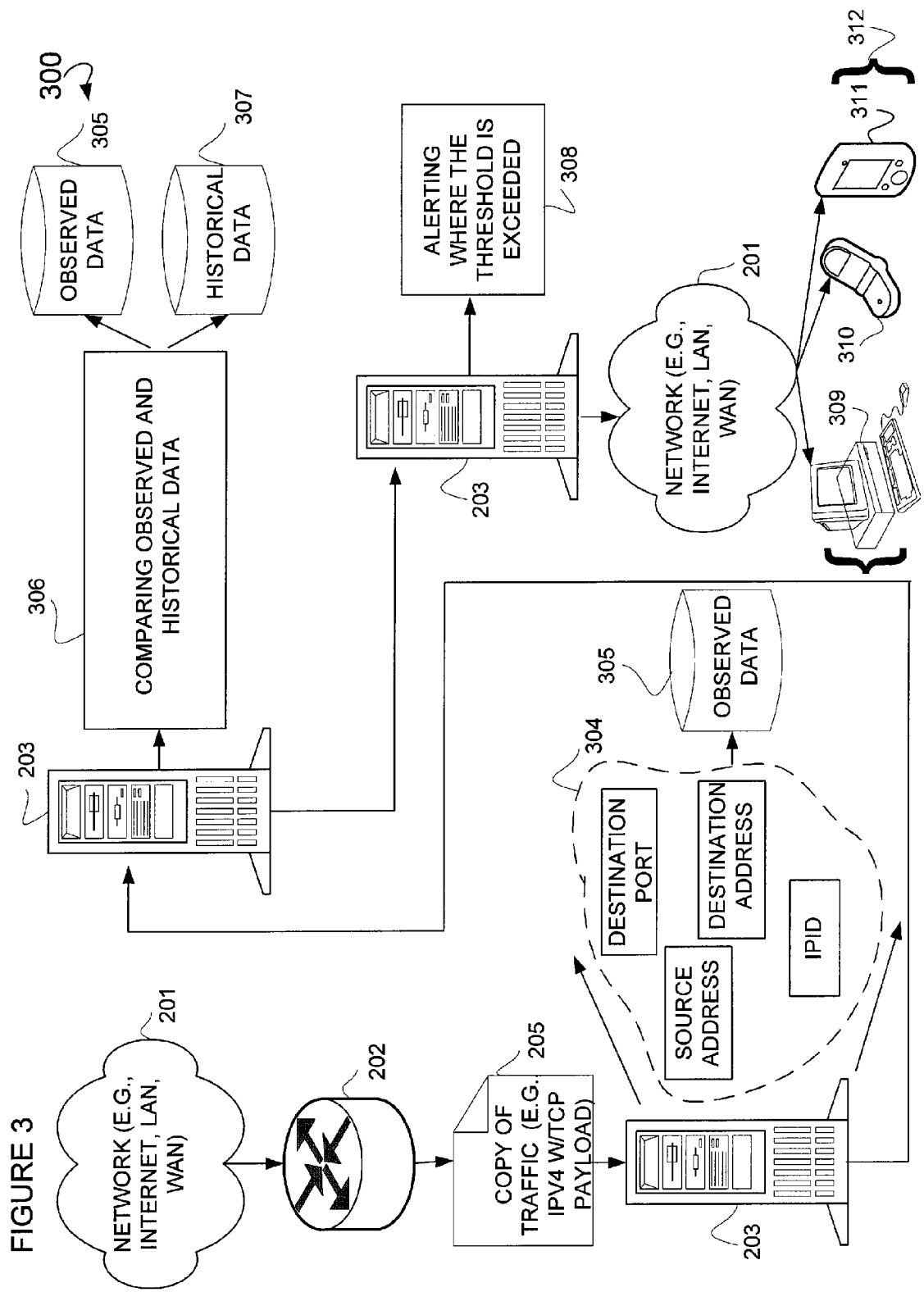
FIG. 3 is an example block diagram illustrating a system with certain modules.

FIG. 3 is an example block diagram illustrating a system 300 with certain modules. In some embodiments, a network 201 is operatively coupled to a router 202. A server 203 obtains a copy of traffic file 205 from this router 202. This copy of traffic file 205 describes the various data packets that the router 202 processes during a predefined time period. In some embodiments, its predefined time period could be 30 seconds, 60 seconds, 90 seconds, or some other suitable period of time. Once the server 203 receives its copy of traffic file 205, it parses its copy of the traffic file 205 and the data packets contained therein into the various fields that make up each of the data packets recorded on the copy of traffic file 205. Illustration 304 describes some of these various fields of the various data packets contained in the copy of traffic file 205. These fields include, for example, destination port or a destination port field, a source address field, a destination address field, and an IPID field. Once these data packets are parsed by the server 203, they are then saved onto an observed data database 305. Once saved, the server 203 executes a module 306 that compares observed and historical data. Observed data is obtained from the aforementioned observed data database 305 while historical data is obtained from a historical data database 307. Once this comparison is made, this server 203 may execute a module 308 that may send an alert where a certain threshold is exceeded. In some embodiments, this threshold is a Standard Deviation (SD) range or threshold. This alert is sent over the network 201 to any one of a number of devices including a computer system 309, a cell phone 310 or a personal digital assistant 311. Collectively, these devices are referred to as devices 312.

An Example Algorithm Used to Detect a DOS Attack

Figure 4:
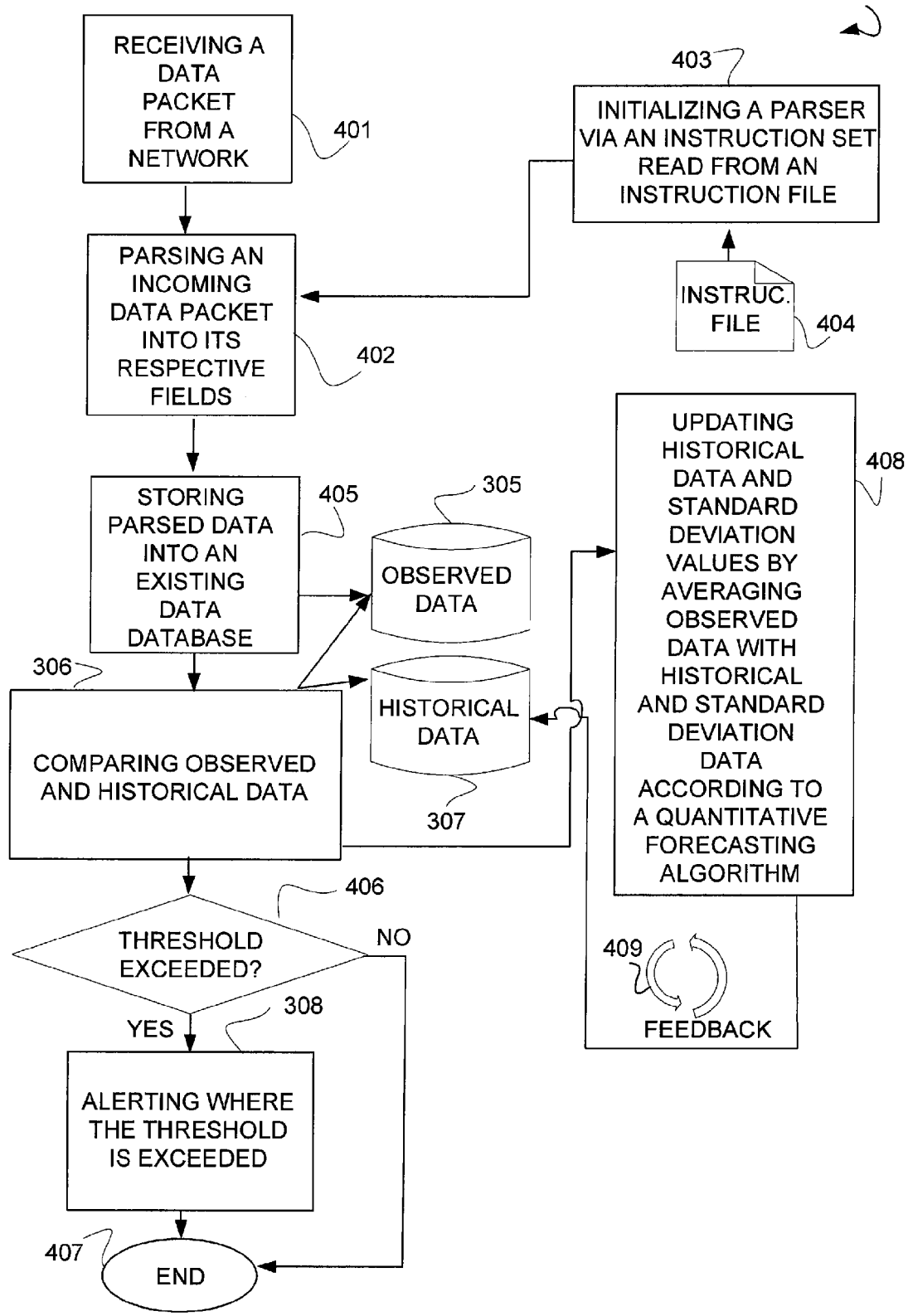
FIG. 4 is a flow chart illustrating an example method that may reside on a server.

FIG. 4 is a flow chart illustrating an example method 400 that may reside on a server 203. In some embodiments, a module 401 receives a data packet from a network then a module 402 parses this data packet into its respective fields. Once parsed, a module 405 stores this parsed data into an existing database that previously mentioned may be an observed data database 305. Next, in some embodiments, a module 306 compares the existing data and historical data wherein the historical data is represented via a historical data database 307. If a SD threshold is exceeded as determined by a decisional step 406 then a module 308 is executed that alerts or sends an alert regarding the threshold being exceeded; if the threshold is not exceeded then no alert is sent. In some embodiments, an instruction file 404 is provided to a module 403 but is used to initialize the module 402 for the purposes of parsing. In some embodiments, this instruction file 404 is an Extensible Mark-up Language (XML) file containing parsing instructions for the various fields that may make up a data packet that may be received by the module 401. For example, parsing instructions relating to a protocol field, a TTL field, a source IP field, a TCP window size field, a TCP destination field, an IP length field, an IPID field, a flag fragmentation field, or a fragmentation offset field may be provided in this instruction file 404. In some embodiments, the various cutoffs for the purposes of parsing are random or randomly generated whereas in some cases these cutoffs are based upon the data contained in each field or the range of data that could be contained in each field. For example, a source IP field can contain values ranging from 0 to 255. Accordingly, cutoffs can be based upon values falling within this range. Once the module 306 is executed that compares existing historical data, the historical data in SD values are updated using a quantitative forecasting algorithm and once updated, these new historical data values and SD values are saved into the historical data database 307. A quantitative forecasting algorithm may include, for example, the Holt-Winters algorithm, or some other suitable algorithm used to forecast data. For example, a Hidden Markov model may be used, a neural network, or some other type of forecasting algorithm known in the art. The interplay between the module 306 and the module 308 constitutes a feedback loop 409 wherein previously used update data is updated, and stored, for subsequent use (see e.g., FIGS. 8 and 9 below) in a future iteration or execution of the method 400 described herein.

Figure 8:
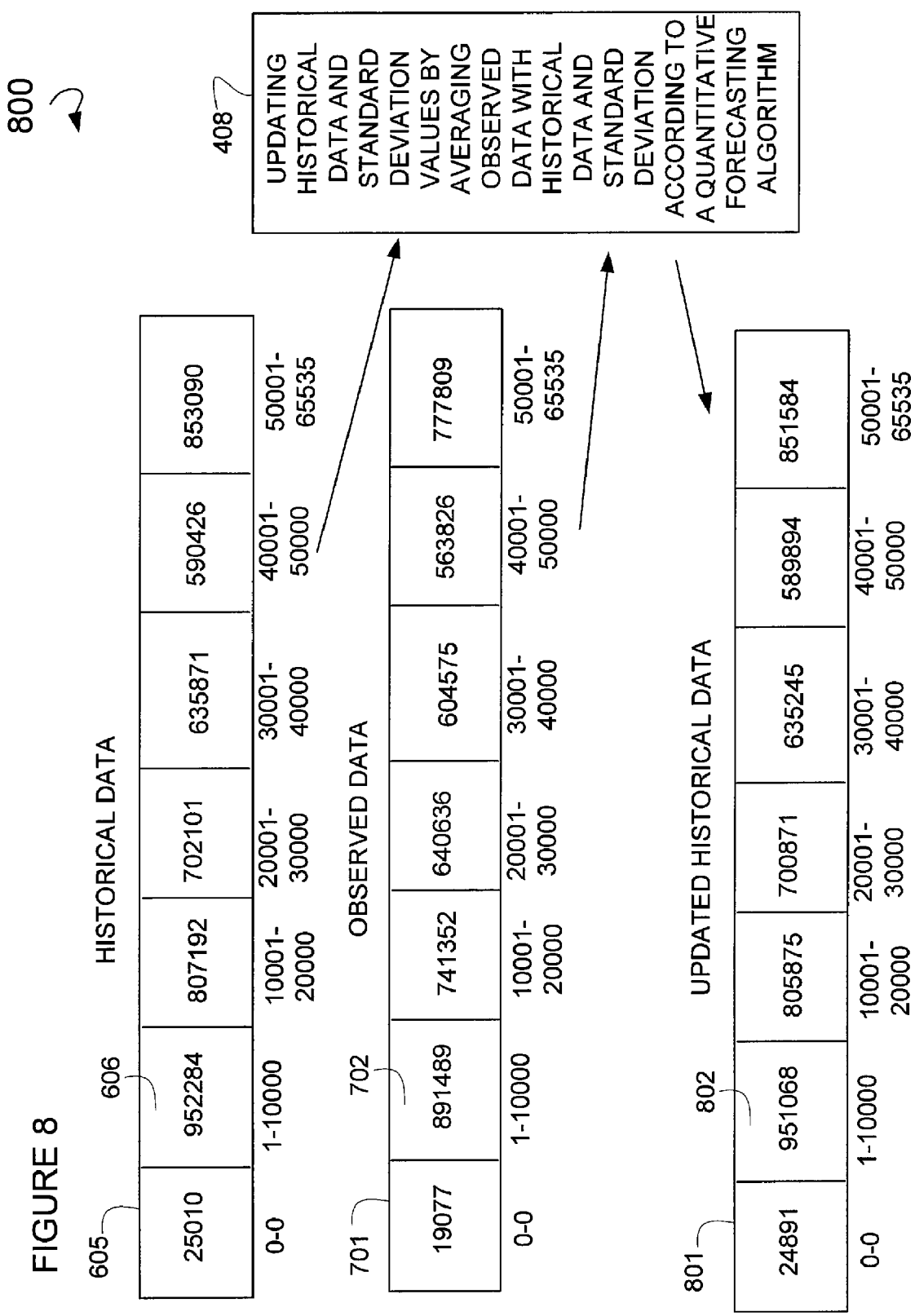
FIG. 8 is an example block diagram illustrating an example execution of a module wherein historical data is updated.
Figure 9:
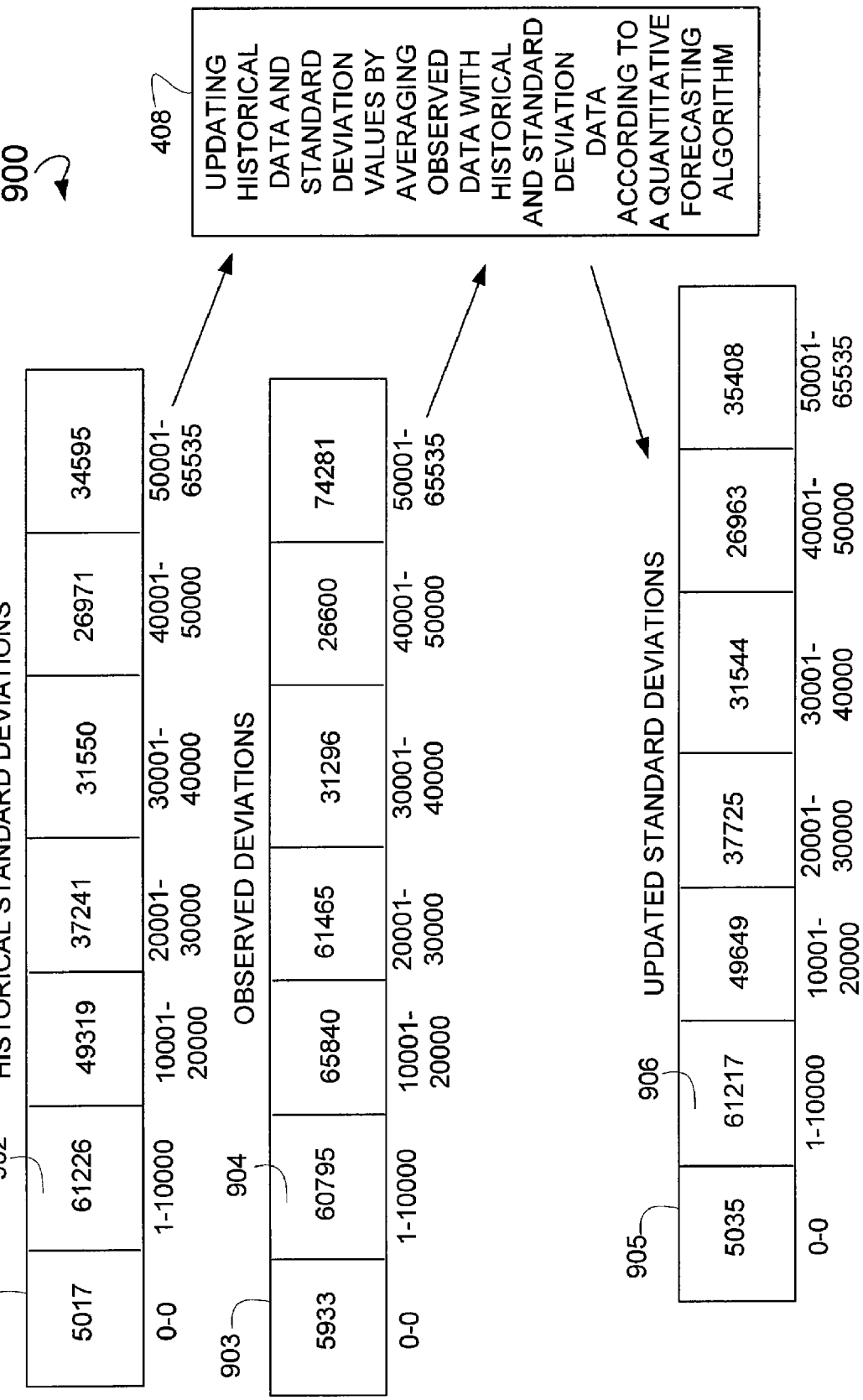
FIG. 9 is an example block diagram illustrating an example execution of an updating module, wherein the standard deviation values are updated.

In some embodiments, the quantitative forecasting algorithm may include the following neural networks: Kohonen self-organizing network, recurrent networks, simple recurrent networks, Hopfield networks, Stochastic neural networks, Boltzmann machines, modular neural networks, committee of machines, Associative Neural Network (ASNN), holographic associative memory, instantaneously trained networks, spiking neural networks, dynamic neural networks, cascading neural networks, neuro-fuzzy networks, or some other suitable neural network. In some example embodiments, a Hidden Markov model is used to generate data. FIGS. 8 and 9 below provide an example application of a quantitative forecasting algorithm.

Figure 5:
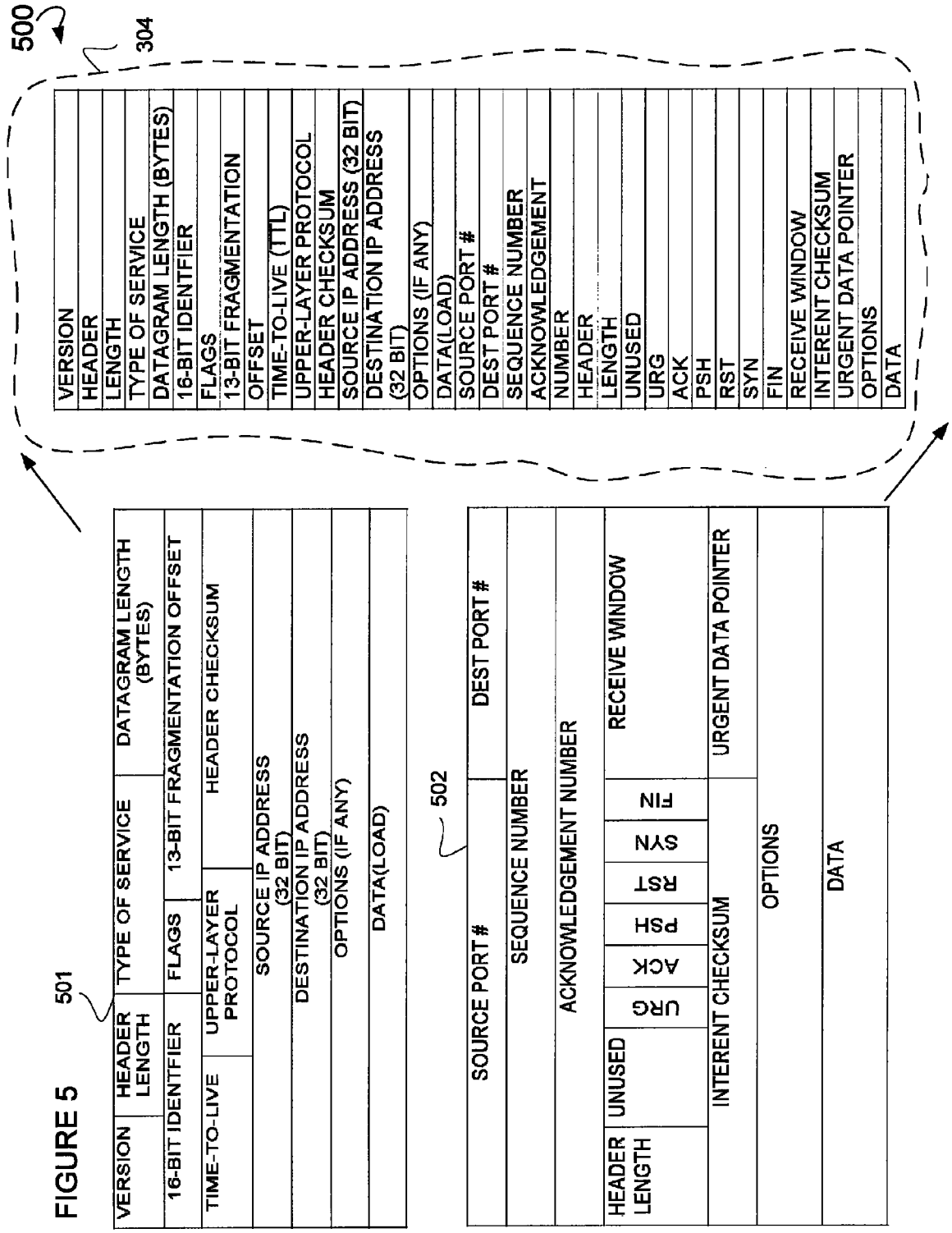
FIG. 5 is an example illustration of the results of the execution of a module used for parsing.

FIG. 5 is an example method illustrating the results of the execution of a module 402 used for parsing. In some embodiments, an Internet Protocol Version 4 (IPV4) datagram 501 and a TCP segment 502 are parsed into their respective fields. These fields as represented by 304 include a version field, a header field, a length field, a type of service field, a datagram length and bytes field, a 16-bit identifier field, a flags field, a 13-bit fragmentation field, an offset field, a TTL field, an upper layer protocol field, a header check sum field, a source Internet protocol address 32-bit field, a destination Internet protocol address 32 bit field, an optional field, a data load field, a source port field, a destination port field, a sequence number field, an acknowledgment field, a number field, a header field, a length field, an unused field, a URG field, a ACK field, a PSH field, an RST field, an SYN field, an FIN field, a receive window field, an Internet check sum field, an urgent data pointer field, an options field, and finally a data field. The type of data packets that can be processed by the parsing module 402 are limited only by the instructions set that is passed to this parsing module 402 by the module 403. This instruction set as previously described as written in XML and it can be used though to parse data packets not only including IPV4 and TCP data packets, but can also be used to parse, for example, packets formatted using the Internet Protocol Version 6 (IPV6) or User Datagram Protocol (UDP) packets. Additionally, packets and other types of network settings can be parsed. These other types of packets may include, for example, Data Over Cable Service Interface Specification (DOCSIS) packets or other suitable packets.

These various IPV4 and TCP data packet fields may include: a TCP flags field, a TCP flag combinations field, an IP number field, an IP TTL field, an IP header checksum, an IP identification number field, an IP fragment bits, an IP fragment offset field, a source IP address field, a destination IP address field, an IP total length field, a TCP sequence number field, a TCP acknowledgement number filed, a TCP window size field, a TCP destination port field, a TCP source port field, a TCP checksum field, a TCP options field, a UDP destination port field, a UDP source port field, a UDP length field, a UDP checksum field, a ICMP type field, a ICMP code field, and a ICMP checksum field.

Figure 6:
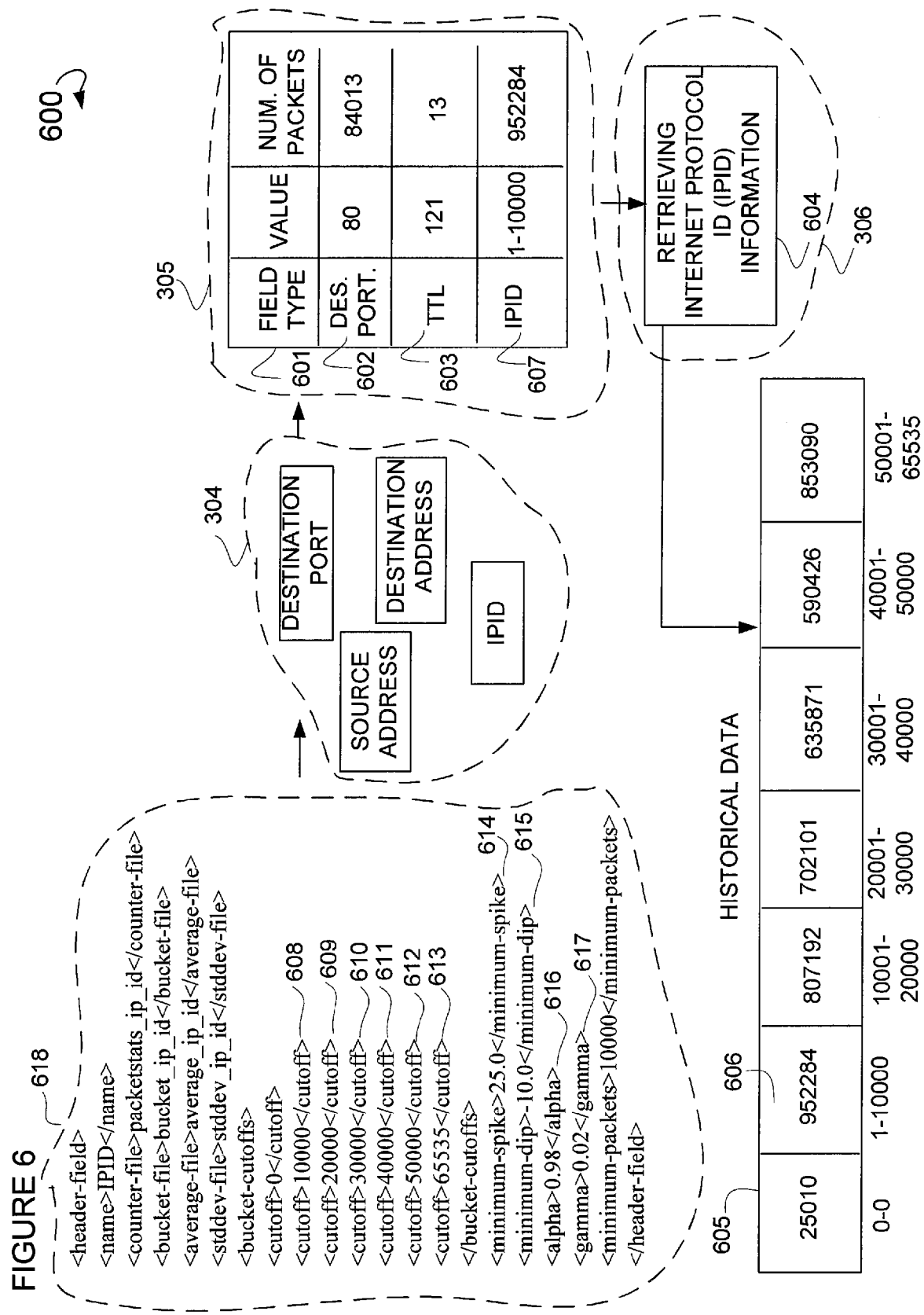
FIG. 6 is an example block diagram illustrating an example initialization process of module and the parsing of incoming data packets, the saving of these data packets and retrieving these data packets.

FIG. 6 is an example block diagram 600 illustrating the initialization process of module 403 and the parsing of incoming data packets, the saving of these data packets and retrieving these data packets. In some embodiments, an instruction file 404 contains an instruction set 618 written in XML. Illustrated in the instruction set 618 is a variety of values that provide instructions regarding how to parse data, analyze data, and set alert values for this data. Cut off values 608-613 provide instructions to, for example, a module 402 on how to parse incoming data packets and, more specifically, the fields contained in these data packets. Here the module 402 is to cut off or parse the TTL fields of an incoming IPV4 data packet at random intervals of 10000, 20000, 30000, 40000, 50000, and 65535. These intervals correspond to 609, 610, 611, 612, and 613 respectively. Additionally, illustrated is an instruction set field 614 describing the minimum spike value of 25 SDs and a field 615 describing a minimum dip value of 10 SDs. In some embodiments, the minimum spike value is the limit beyond which an alert may be sent to inform one of a possible DOS attack. Similarly, the minimum dip value, is a value below which an alert may be set to a user. Also illustrated are an alpha field 616 with a value of 0.98 and a gamma field 617 with a value of 0.02. These values (e.g., 0.98, 0.02) may be used by a module 408. These alpha and gamma fields and their respective values may be more fully discussed below in the discussion relating to the quantitative forecasting algorithm. All these fields contained in the instruction set 618, and the values contained therein, can be set based upon empirical testing and/or modeling to meet the needs of a specific network or system (e.g., System 200). Furthermore, in lieu of, or in addition to, an XML file some other type of delimited file (e.g., a flat file) may be implemented with an instruction set 618. The values in this instruction set 618 may be determined by, for example, a system administrator or other party charged with managing the security responsibilities for a system.

These instructions are used by the module 402 to parse, for example, an IPID field contained in, for example, and an IPV4 data packet. Once parsed, these parsed fields are then saved into the previously described observed data database 305 in the form of one or more various database tables. These tables may have the form of, for example, various columns 601 relating to field type, value, and the number of packets, with entries (e.g., tuples) relating to the specific data packet field being parsed and stored. For example, these entries may include a destination port field 602, a TTL field 603, and an IPID field 607. For each field type there is a corresponding value representing the cutoff or parse values contained in the instruction set 618. Additionally, corresponding to each value field is a number of packet fields describing the number of packets corresponding to this cutoff value and field type (e.g., destination port, TTL, IPID). In some embodiments, once these parsed data fields are stored to the database 305 via a module 405, they are retrieved via a module 604 that resides in and is a part of the module 306. The module 604 may retrieve (e.g., select) certain field types using, for example, a structured query language (SQL) and store these various field types in a data structure such as an array, hash table, tree, binary search tree, heap, or some other suitable data structure.

Described herein is an array 605 containing various packet values corresponding to various cutoff values for the TTL entries. For example, a field 606 contains a value of 952284 and corresponds to the cutoff values of 1 to 10,0000. Additionally depicted are other cutoff values in corresponding number of data packets with specific TTL values (e.g., 10001-20000, 20001-30000, 30001-40000, 40001-50000, and 50001-65535).

In some embodiments, databases are implemented wherein tables of data are created and data is inserted into, or selected from, these tables using SQL or some other database-related language known in the art. These tables of data can be managed using a database application such as, for example, MYSQL™, SQLSERVER™, Oracle 9I™ or 10G™, or some other suitable database application. These tables, in some embodiments, are organized into a relational-database schema (RDS) or object-relational-database schemas (ORDS), as is known in the art. These schemas can be normalized using certain normalization algorithms so as to avoid abnormalities such as non-additive joins and other problems. Moreover, these normalization algorithms include Boyce-Codd Normal Form or some other normalization, optimization algorithms known in the art. For example, in some embodiments, field type data is created and associated with a value and a data packet number data, and is stored into a database table (see e.g., 601) contained in a database (see e.g., databases 204, 305, and 307 referenced above). Once associated, these database tables are then normalized, and data from this table selected from them using, for example, SQL.

Figure 7:
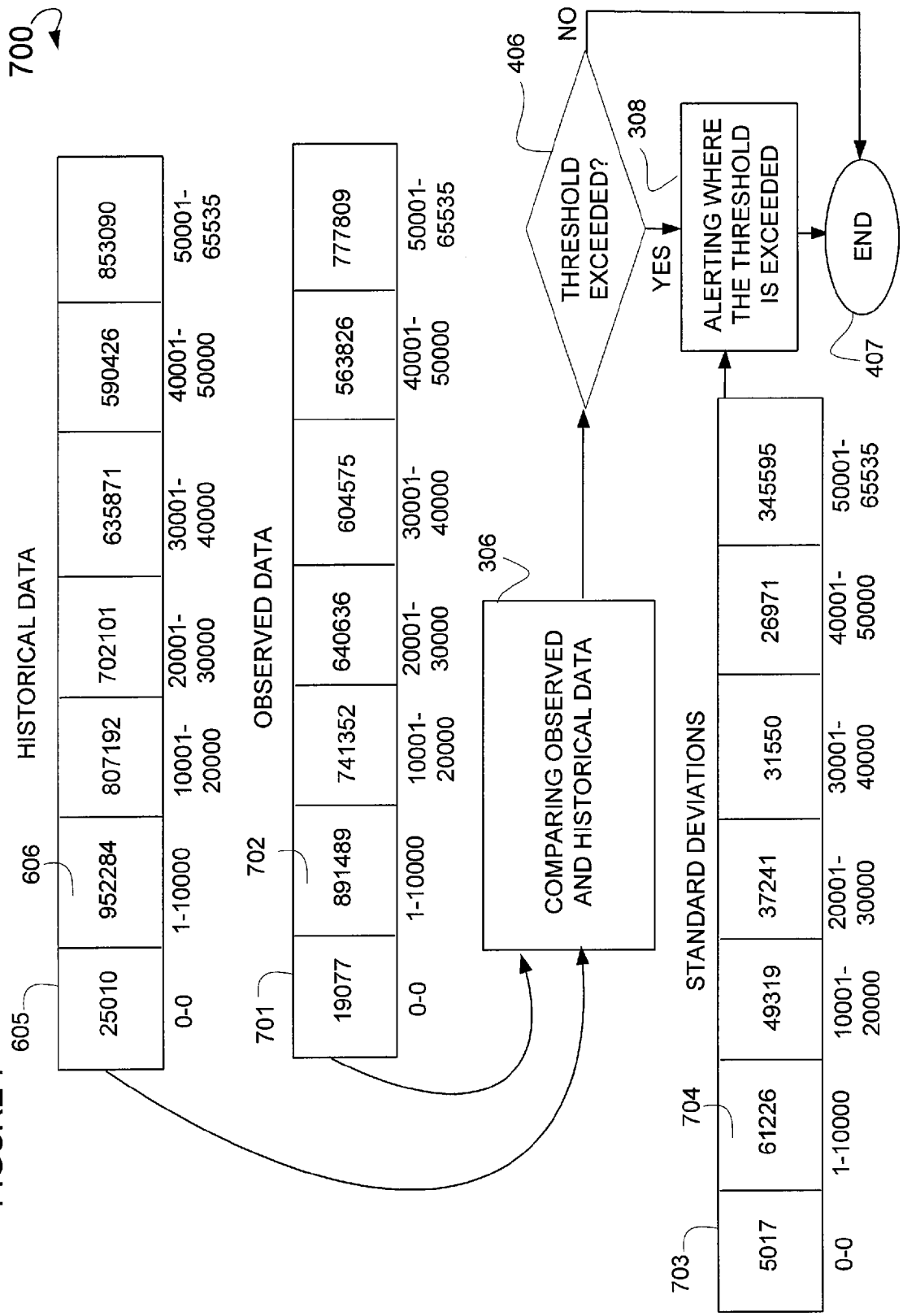
FIG. 7 is an example block diagram illustrating the execution of a comparison module that compares observed and historical data.

FIG. 7 is an example block diagram 700 illustrating the execution of a comparison module 306 that compares observed and historical data. A previously described array 605 containing data known as historical data may be compared, or mapped, to an array 701 containing, for example, a field 702 with data in the form of an 891489 value. A module 306 may compare each field of the historical data array 605 to the observed data array 701 to determine whether a SD threshold or range has been exceeded. In some embodiments, where a SD of 25 is exceeded (e.g., an SD high is exceeded), an alert is sent to any number of devices 312 whereas, in some embodiments, if the data values fail to meet a SD of 6 (e.g., an SD low is not met) an alert is sent to any one of these same devices 312. Collectively these SD highs and SD lows are referred to herein as an SD range. Decisional step 406 reflects this determination of whether a SD threshold or SD range has been exceeded or not met. For example, array 703 has a field 704 with an SD value of 61226. In cases where an SD of 25 is exceeded (e.g., SD high) an alert may be sent, and cases where an SD of 6 below (e.g., SD low) is not met an alert may be sent.

Example Application of a Quantitative Forecasting Algorithm

FIG. 8 is an example block diagram 800 illustrating an example execution of a module 408 wherein historical data is updated. In some embodiments, the array 605 and array 701 are passed to a module 408 titled updating historical data and SD values by averaging observed data with historical data and SD according to a quantitative forecasting algorithm. In some cases, module 408 makes an SQL call to the historical data database 307 to retrieve data to be updated with the current observed data contained in the observed data database 305. This current observed data may, for example, be passed to the module 408 by, for example, the module 306. In other embodiments, the module 408 may itself make an SQL query to the observed data database 305. Once received, the historical data array 605 and observed data array 701 are processed by a quantitative forecasting algorithm residing in the module 408 to generate an updated historical data array 801. Here this array 801 may contain an updated historical data field 802 with the value 951068. This array 801, may then be passed using, for example, an SQL statement to the historical data database 307 to form a new historical data set.

In some embodiments, implemented within the module 408 is a quantitative forecasting algorithm used to predict the number of field values for a particular field of a data packet coming across a network to, for example, a web server 207. This algorithm may be presented by the following example mathematical equation:

$$[Ao*'A+Odata*(1-'A)] = \text{updated historical data value},$$

where: Ao=the old average value (e.g., historical data);
 Odata=the observed data;
 'A=here is 0.98.
One example application of this mathematical equation is in updating the value in the previously described field 802. In that field, an updated value of 951068 is generated using the mathematical equation (952284*0.98+891489*(1−0.98)=951068) with the result being rounded to the nearest whole number value. The A (Alpha) value may be provided by the previously described instruction set 618 and field 616 of this instruction set. In some embodiments, the value contained within field 616 may be based upon empirical testing and/or modeling to determine the best weighting value to implement.

FIG. 9 is an example block diagram 900 illustrating an example execution of an updating module 408, wherein the SD values are updated. In some embodiments, a historical standard deviation array 901 containing, for example, a field 902 with a value of 61226, and an observed deviations array 903 containing, for example, a field 904 with a value of 60795 are passed to the module 408. After applying the quantitative forecasting algorithm previously described, a new updated standard deviation array 905 is generated that contains, for example, a field 906 with a new standard deviation value of 61217 for the range of IPIDs that fall between 1 and 10,000. As described above, the module 408 may make SQL queries or calls to the historical data database 307 that contains SD data in order to select or retrieve such data. This quantitative forecasting algorithm may be presented by the following example mathematical equation:

$$[Osd*\Gamma+SDo*(1-\Gamma)] = \text{updated standard deviation value},$$

where: SDo=the old standard deviation (e.g., historical standard deviation);
 Osd=the observed standard deviation;
 Γ=here is 0.02.
One example application of this mathematical equation is in the updating of the value in the previously described field 906. In that field, an updated value of 61217 is generated using the above mathematical equation (61226*0.98+60795*(1−0.98) =61217) with the result being rounded to the nearest whole number value. The Γ (Gamma) value may be provided by the previously described instruction set 618 and field 617 of this instruction set. In some embodiments, the value contained within field 617 may be based upon empirical testing and/or modeling to determine the best weighting value to implement.

Component Design

In some embodiments, the previously described modules are written as one or more software components or modules. Common too many of these modules are the ability to generate, use, and manipulate the previously described data and/or data sets. These modules, and associated functionality, may be used by the client, server, or peer-to-peer applications. These various modules can be implemented into the system on an as-needed basis. These modules may be written in an object-oriented-computer language such that a component oriented or object-oriented programming technique can be implemented using, a Visual Component Library (VCL), Component Library for Cross Platform (CLX), Java Beans (JB), Java Enterprise Beans (EJB), Component Object Model (COM), or Distributed Component Object Model (DCOM), just to name a few. These modules may be linked to another program via various APIs and then compiled into one complete server-client and/or peer-to-peer application. The process for using modules in the building of client-server and/or peer-to-peer applications is well known in the art. These modules may be linked together via various distributed programming protocols as distributed computing modules.

Distributed Computing Modules

In some embodiments, remote procedure calls are used to implement one or more of the described modules across a distributed programming environment. For example, a module 401, 402, and 405 may be stored and implemented on a first computer system that is remotely located from a second computer system containing modules 306 and 408. These first and second computer systems can be configured in a server-client, peer-to-peer, or some other network configuration. These various modules can be written using the above described component design techniques, and can be written in the same programming language, or a different programming language. Various protocols are implemented, in some embodiments, to enable these various levels and components contained therein, to communicate regardless of the programming language used to write these components. For example, a module written in C++ using COBRA or SOAP can communicate with another remote module written in JAVA™. These protocols include Simple Object Access Protocol (SOAP), the Common Object Request Broker Architecture (CORBA), or some other suitable protocol. These protocols are well-known in the art.

Example Implementation of Alerting

Figure 10:
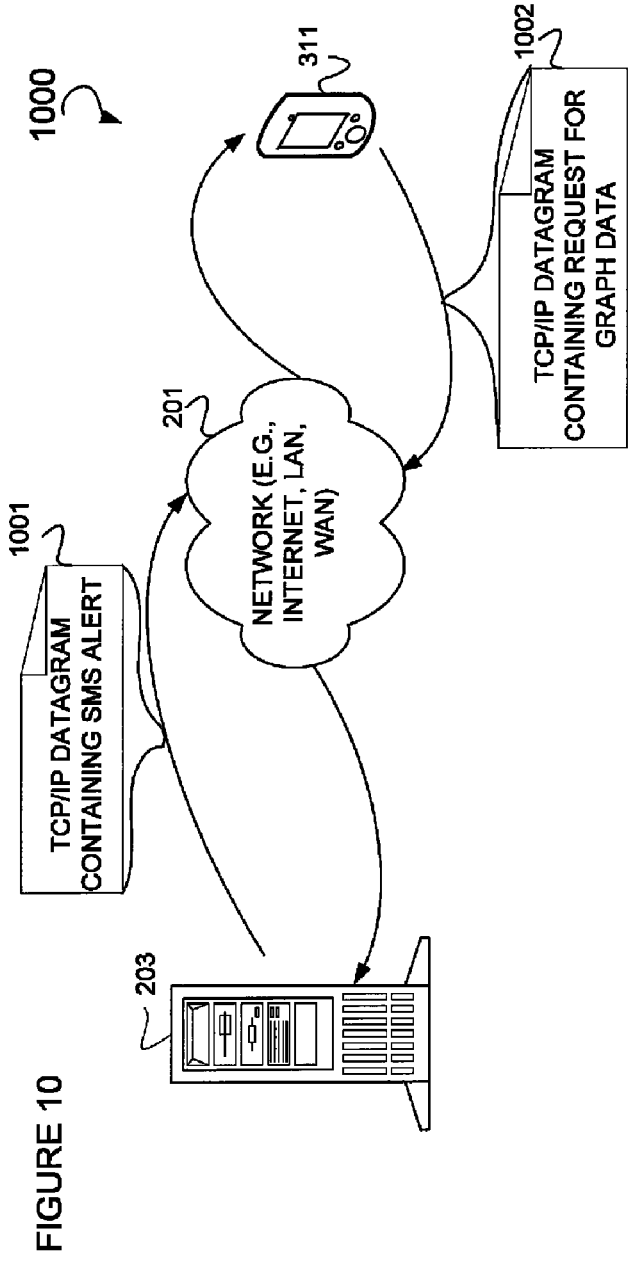
FIG. 10 is an example block diagram illustrating a system wherein an alert sent out over a network.

FIG. 10 is an example block diagram illustrating a system 1000 wherein an alert is sent out over a network. In some embodiments, a server 203 is operatively coupled to a network 201 which, in turn, is operatively coupled to a PDA 311. In cases where an SD range is exceeded, an alert 1001 may be sent using a Short Message Service (SMS) protocol over a transmission control/Internet protocol or TCP/IP datagram. This SMS alert may be sent from the server 203 to the PDA 311 and may appear, on the PDA 311, as a text message informing a user of the PDA 311 that the SD range or threshold has been exceeded. A TCP/IP datagram containing a request for graphic data represented herein as 1002 may be sent from the PDA 311 over the network 201 back to the server 203. The transmission of the SMS based messages between a Short Message Service Centre (SMSC) (e.g., a server 203 by itself or using another server as a proxy to serve as an SMSC) and phone may be performed through different protocols such as Signaling System #7 (SS7) protocol within the Global System for Mobile Communications (GSM) Mobile Application Part (MAP) framework, or TCP/IP within the same standard. Additionally, a SMS message may also be sent over a Code Divisional Multiple Access (CDMA) network.

Figure 11:
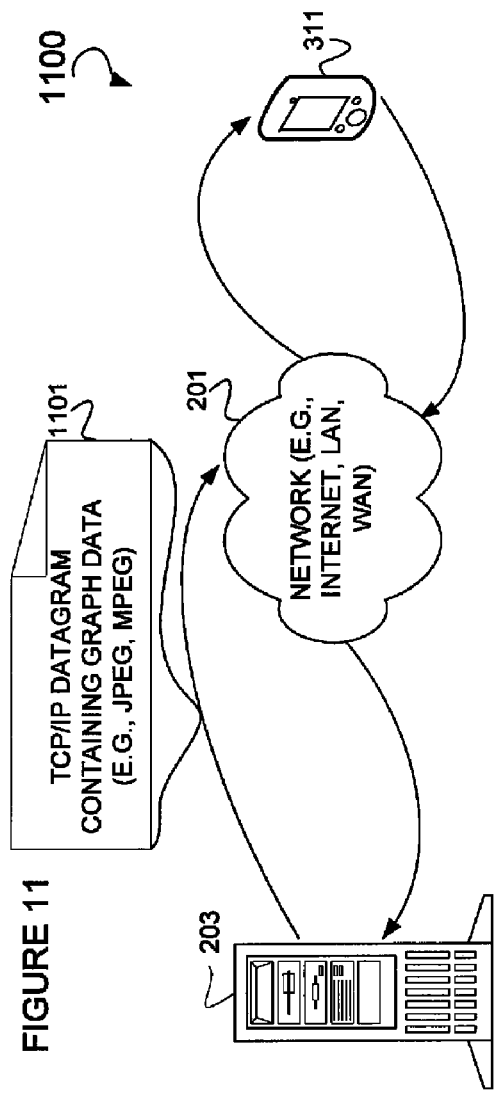
FIG. 11 is an example block diagram of a system illustrating an example request for graph data.

FIG. 11 is an example block diagram of a system 1100 illustrating an example request for graph data. This request may occur before or after an alert has been sent. In some embodiments, once a user using, for example, a PDA 311 sends a request for graph data over the previously described network 201 to the server 203, the server 203 may respond by sending an TCP/IP datagram containing graph data in the form of a JPEG file or Joint Pictures Expert Group, or MPEG file or Motion Pictures Expert Group file to the PDA 311. This JPEG or MPEG file may contain a graphical representation of the basis for the alert. In some embodiments, a real time media stream using either one of these formats may be sent using, for example, Real-Time-Transport Protocol (RTP) packets in conjunction with TCP/IP, UDP/IP or some other protocol known in the art. This graphical representation or an example of this graphical representation is described below.

Figure 12:
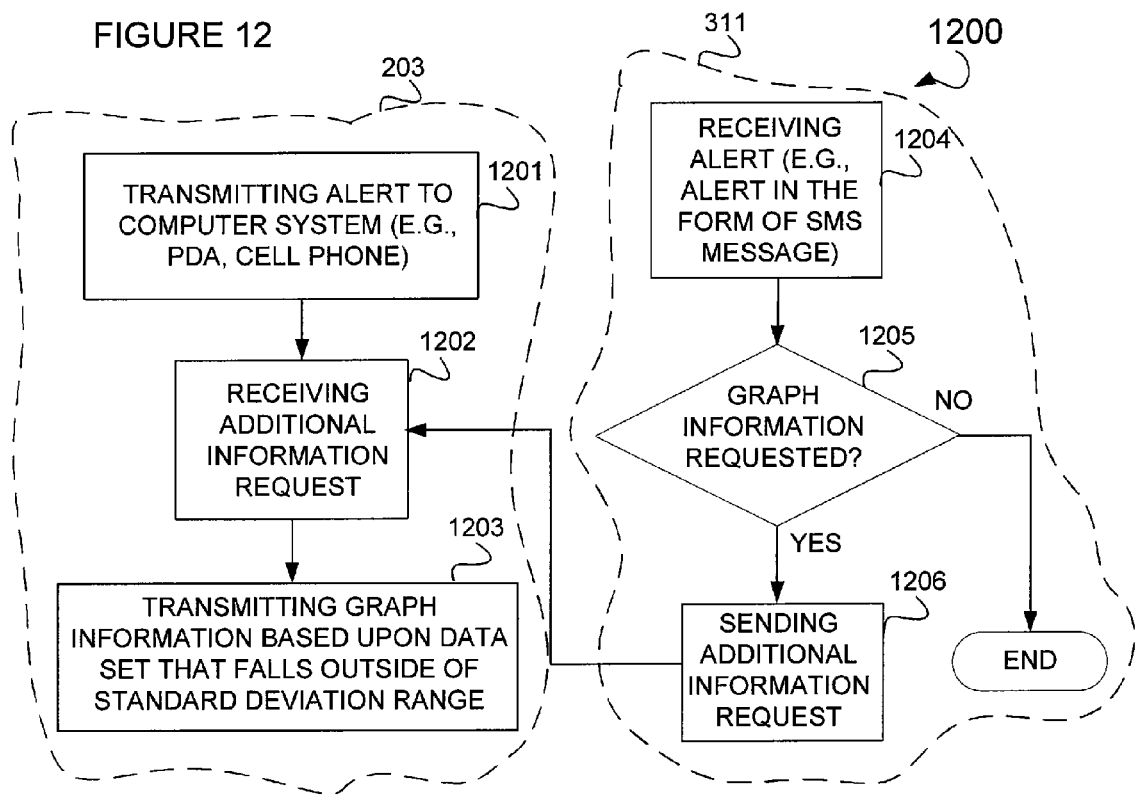
FIG. 12 is a flow chart illustrating an example method to alert a user of the existence of a DOS attack

FIG. 12 is a flow chart illustrating an example method 1200 to alert a user of the existence of a denial of service or DOS attack. In some embodiments, a module 1201 transmits an alert to a computer system wherein the computer system may be, for example, a cell phone 310, PDA 311, or computer system 309 (collectively devices 312). Once the computer system receives the alert via a module 1204, the user is provided the option via a decisional step 1205 to request a graphical representation of the information or to request no information. In cases where the user requests graphical information, a module 1206 requests the sending of additional information in the form of graphical information from a module 1202 called a receiving additional information request module. Once module 1202 is executed, an additional module 1203 is executed that actually transmits the graphical data to the user or, more specifically, the user's device (e.g., devices 312). With regard to the issue of where these modules reside, modules 1201, 1202, and 1203, in some embodiments, may reside on a server 203 while modules 1204, 1205, and 1206 may reside on, for example, a PDA 311 or, more generally, the devices 312. These various modules (e.g., 1201-1206) may be allowed to communicate using principles of socket programming in conjunction with the previously described principles of distributed computing.

A Graphical Representation of Network Traffic Including a DOS Attack

Figure 13:
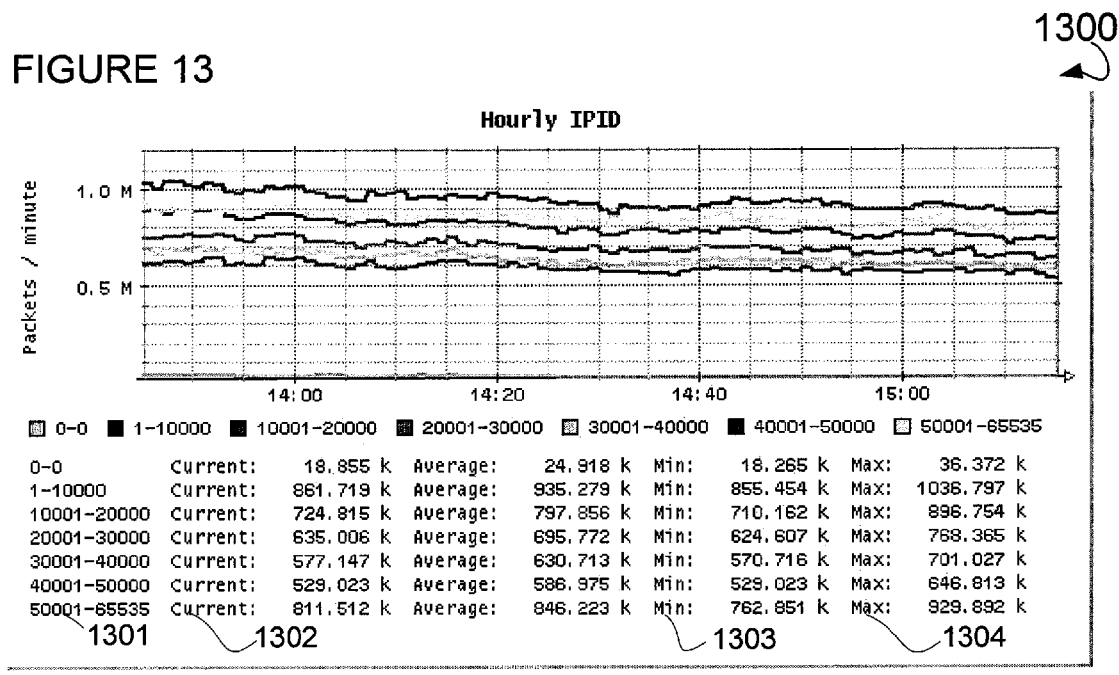
FIG. 13 is an example graph illustrating network traffic viewed in terms of Internet Protocol Identification (IPID) field data.

FIG. 13 is an example graph 1300 illustrating network traffic viewed in terms of IPID field data traffic. In some embodiments, a Round Robin Database (RRD) tool, or other suitable graphing tool/program, is used to generate a graph of data packets (e.g., IPV4) over time (e.g., 60 seconds) as aggregated over some larger period of time or history (e.g., 100 minutes). Here, various IPID cut-off values 1301 are illustrated that correspond to the cut-off values described for the instruction set file 404 as depicted in, for example, FIG. 6. Additionally illustrated is a current value 1302 that reflects the number of current IPID values per data packet over a certain period of time (e.g., 60 seconds). For example, the number of data packets with an IPID value in the range value of 1-10000 was 674,319. During this same time period, the minimum number 1303 of data packet for the range of 1-10000 was 610,862 for a 60 second period, and maximum number 1304 was 732,361.

In some embodiments, other fields types with a data packet may be graphed including a TCP flags field, a TCP flag combinations field, an IP number field, an IP TTL field, an IP header checksum, an IP identification number field, an IP fragment bits, an IP fragment offset field, a source IP address field, a destination IP address field, an IP total length field, a TCP sequence number field, a TCP acknowledgement number filed, a TCP window size field, a TCP destination port field, a TCP source port field, a TCP checksum field, a TCP options field, a UDP destination port field, a UDP source port field, a UDP length field, a UDP checksum field, a ICMP type field, a ICMP code field, and a ICMP checksum field. Additionally, some other suitable field known in the art may be graphed.

Figure 14:
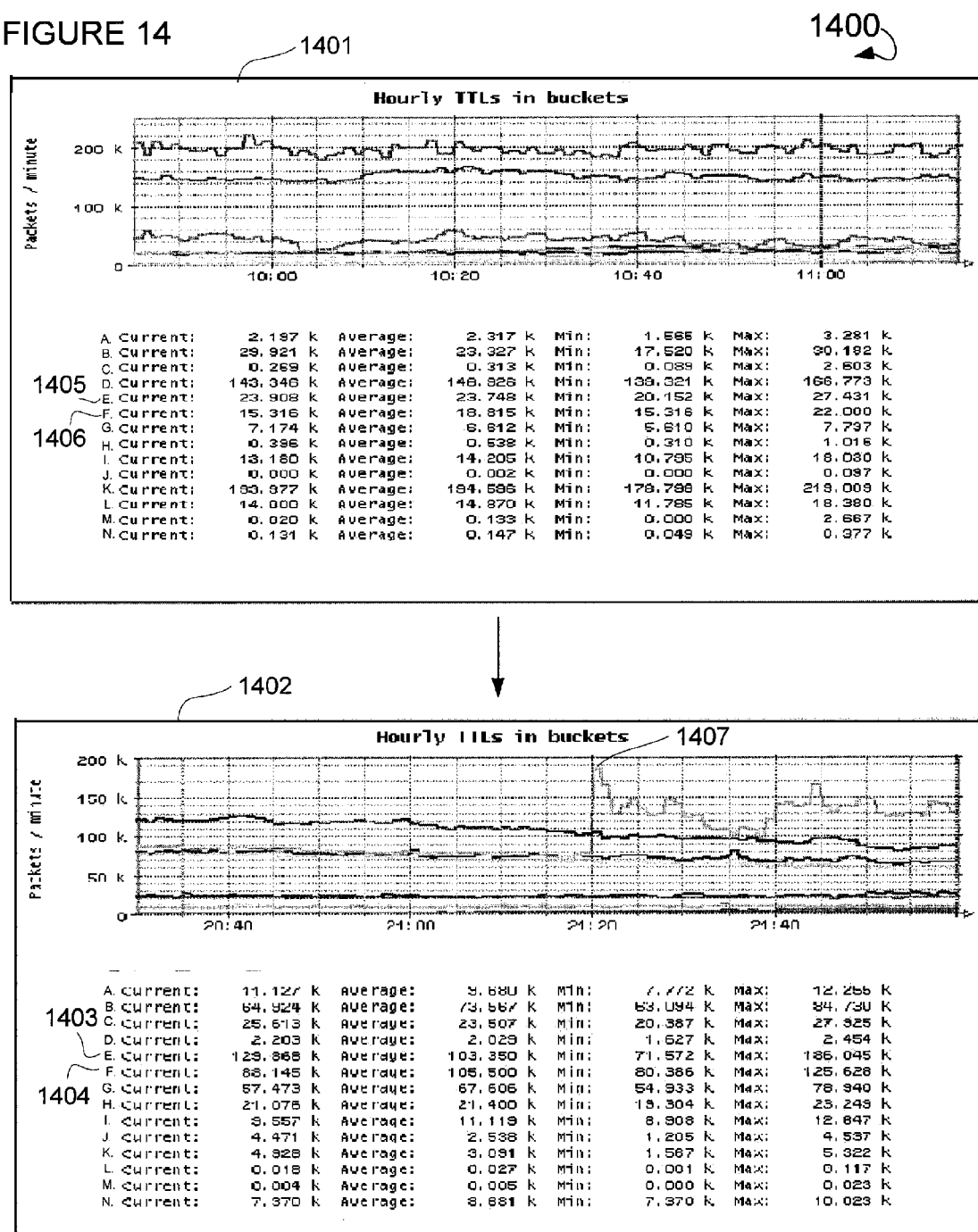
FIG. 14 is an example graph illustrating Time-To-Live (TTL) data both before and after a DOS attack, where the DOS attack is directed towards specific ranges of TTL data.

FIG. 14 is an example graph 1400 illustrating TTL data both before and after a DOS attack, where the DOS attack is directed towards specific ranges of TTL data. Graph 1400 illustrates a number data packets containing TTL fields with a specific range of values passed across a network to a router (e.g., router 202) and ultimately to a server (e.g., web server 207). Illustrated in 1401 is the various current, average, minimum, and maximum numbers of TTL packets reflecting the normal flow of packets containing TTL data across the network to a server. An abnormal flow, possibly signifying a DOS attack, of data packets containing a specific range of TTL field values is reflected in 1402. Ranges E and F, corresponding to 1403 and 1404 respectively, reflect an abnormal flow of data packets for these ranges. For example, whereas the normal current value for range E (e.g., 1405) was 23,908, the abnormal value for E was 129,868. And again, while the normal current field value for range F (e.g., 1406) was 15,316, the abnormal value for F was 88,145. In some embodiments, ranges A-N correspond to values such as 0-512, and various intervals within this range (e.g., 0-64, 64-128, 128, 264, 264-512). These values are typically binary, but are presented here in their decimal form for ease of understanding. Additionally depicted is a spike 1407 depicting an abnormal number of data packets containing a specific range of TTL values. Here the spike 1407 occurred just after the 21:20 time period.

Platform Architecture

Figure 15:
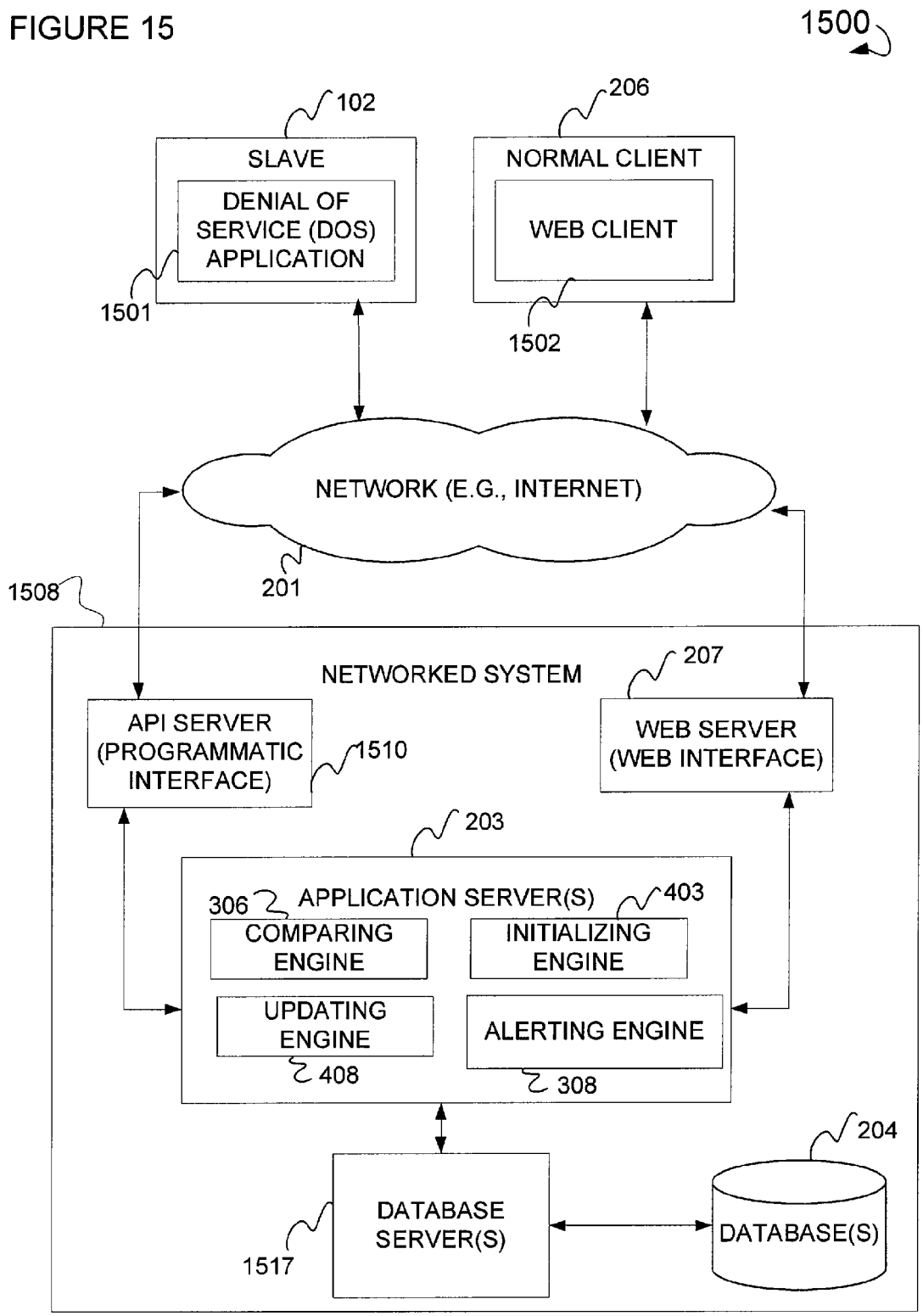
FIG. 15 is an example network diagram depicting platform architecture, within which one example embodiment may be deployed.

In some embodiments, some of the above described components and modules are assembled to form a platform architecture. FIG. 15 is an example network diagram depicting platform architecture 1500, within which one example embodiment may be deployed. FIG. 15 illustrates, for example, a web client 1502 (e.g., a browser, such as the INTERNET EXPLORER™ browser developed by Microsoft Corporation of Redmond, Wash. State), and a networked system 1508.

An Application Program Interface (API) server 1510 and a web server 207 are coupled to, and provide programmatic and web interfaces respectively to, one or more application servers 203. The application servers 203 are, in turn, shown to be coupled to one or more databases servers 1517 that facilitate access to one or more databases 204.

Further, while the system 1500 shown in FIG. 15 employs a client-server architecture, additional architectures may be implemented including a distributed, or peer-to-peer, architecture system, for example. Similarly, the networked system 1508 accesses the various services and functions provided by the application server 203 via the programmatic interface provided by the API server 1510. The networked system 1508 may, for example, implement a security application to enable a network administrator to manage security settings and alert settings on the networked system 1508 in an off-line manner, and to perform batch-mode communications between the networked system 1508 and devices 312.

FIG. 15 also illustrates, for example, a DDOS application residing on a slave computer 102. As described elsewhere, in some embodiments, a DDOS application is placed into a computer system so as to make it a slave computer system 102. This slave computer system 102 may be able to access the networked system 1508 through an API 1510 so as to flood the networked system with data packets in an attempt to slow the system, or, in the worse case, to crash the networked system 1508. Additionally, the slave computer 102 may flood the networked system through the web server 207 and interface contained therein.

A Computer System

In some embodiments, the present invention is implemented on a digital processing system or computer system that includes a processor, which may represent one or more processors and may include one or more conventional types of such processors (e.g., x86, x86-64, ARMx), such as an AMD processor, Intel Pentium or XScale processor or other suitable processor. A memory is coupled to the processor by a bus. The memory may be a Dynamic Random Access Memory (DRAM) and/or may include Static Random Access Memory (SRAM). The processor may also be coupled to other types of storage areas/memories (e.g., cache, Flash memory, disk, etc.), which could be considered as part of the memory or separate from the memory.

In some embodiments, a bus further couples the processor to a display controller, a mass memory or some type of computer-readable medium device, a modem or network interface card or adaptor, and an Input/Output (I/O) controller. In some embodiments, the display controller controls, in a conventional manner, a display, which may represent a Cathode Ray Tube (CRT) display, a Liquid Crystal Display (LCD), a plasma display, or other type of suitable display device. Computer-readable media may include a mass memory magnetic, optical, magneto-optical, tape, and/or other type of machine-readable medium/device for storing information. For example, the computer-readable media may represent a hard disk, a read-only or writeable optical CD, etc. In some embodiments, a network adaptor card such as a modem or network interface card is used to exchange data across a network such as an Internet. In some embodiments, the I/O controller controls I/O device(s), which may include one or more keyboards, mouse/trackball or other pointing devices, magnetic and/or optical disk drives, printers, scanners, digital cameras, microphones, etc.

In some embodiments, the present invention may be implemented entirely in executable computer program instructions that are stored on a computer-readable medium or may be implemented in a combination of software and hardware, or in certain embodiments, entirely in hardware.

Embodiments within the scope of the present invention include computer-readable media for carrying or having computer-executable instructions or data structures stored thereon. Such computer-readable media may be any available medium, which is accessible by a general-purpose or special-purpose computer system. By way of example, and not limitation, such computer-readable media can comprise physical storage medium such as Random Access Memory (RAM), Read Only Memory (ROM), Erasable Programmable Read-Only Memory (EPROM), CD-ROM or other optical-disk storage, magnetic-disk storage or other magnetic-storage devices, or any other medium that can be used to carry or store desired program code means in the form of computer-executable instructions, computer-readable instructions, or data structures and that may be accessed by a general-purpose or special-purpose computer system. This physical storage medium may be fixed to the computer system as in the case of a magnetic drive or removable as in the case of an Electronically Erasable Programmable Read Only Memory (EEPROM) device (e.g., flash memory device).

In some embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the proceeding descriptions should also be included within the scope of computer-readable medium. Computer-executable or computer-readable instructions comprise, for example, instructions and data that cause a general-purpose computer system or special-purpose computer system to perform a certain function or group of functions. The computer-executable or computer-readable instructions may be, for example, binaries, or intermediate format instructions such as assembly language, or even source code.

In this description and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or Personal Digital Assistant (PDA)) where internal modules (e.g., a processor and memory) work together to perform operations on electronic data.

In some embodiments, the invention may be practiced in network computing environments with many types of computer system configurations, including hubs, routers, wireless access points (APs), wireless stations, personal computers, laptop computers, hand-held devices, multi-processor systems, microprocessor-based or programmable consumer electronics, network PCs, minicomputers, mainframe computers, mobile telephones, PDAs, pagers, or other suitable environments. The invention can also be practiced in distributed system environments where local and remote computer systems, which are linked (e.g., either by hardwired, wireless, or a combination of hardwired and wireless connections) through a network, both perform tasks. In a distributed system environment, program modules may be located in both local and remote memory-storage devices (see below).

Figure 16:
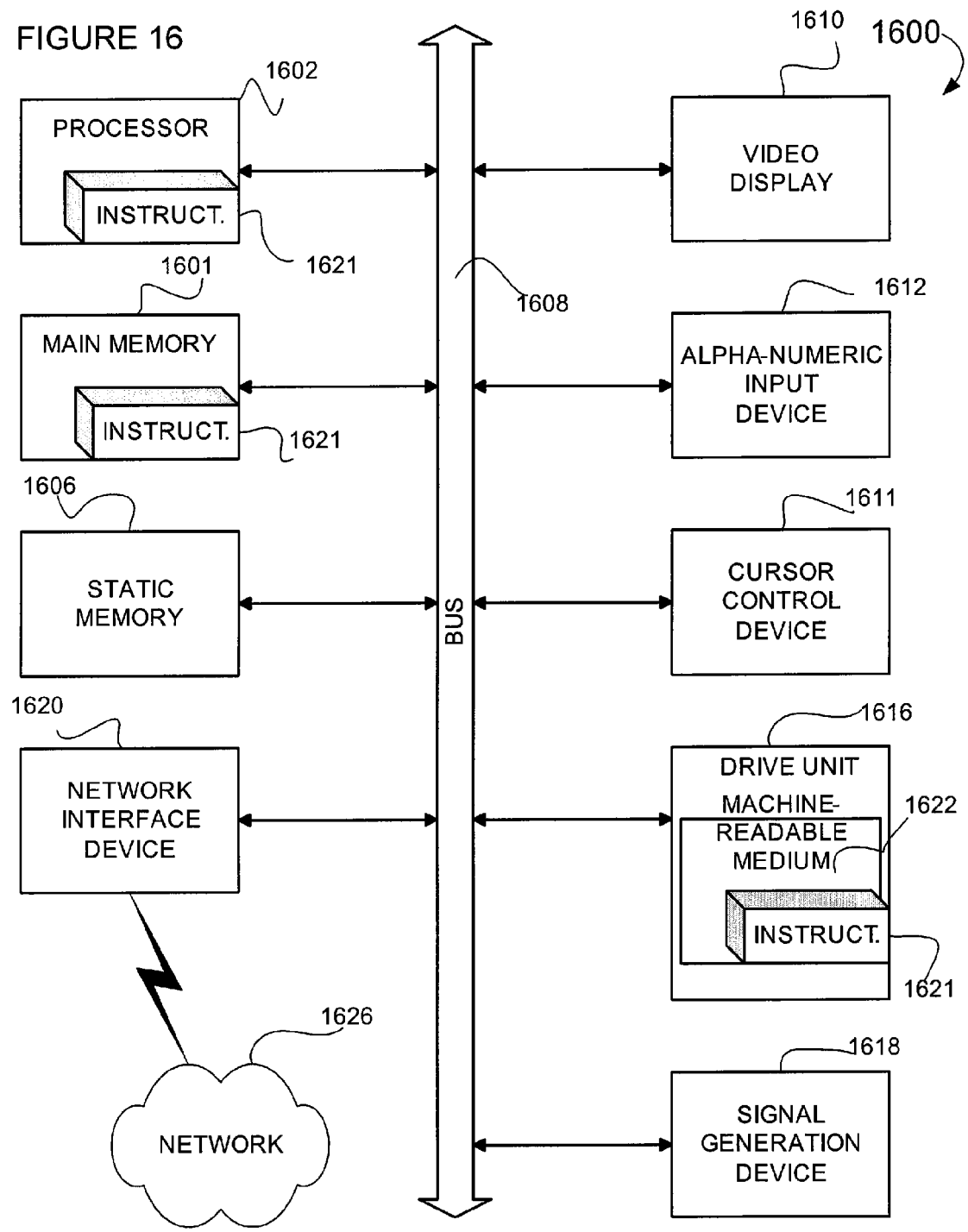
FIG. 16 shows a diagrammatic representation of a machine in the example form of a computer system within which a set of instructions, for causing the machine to perform any one or more of the methodologies discussed herein, may be executed.

FIG. 16 shows a diagrammatic representation of a machine in the example form of a computer system 1600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks. In a distributed system environment, program modules may be located in both local and remote memory-storage devices (see below).

The example computer system 1600 includes a processor 1602 (e.g., a Central Processing Unit (CPU), a Graphics Processing Unit (GPU) or both), a main memory 1601 and a static memory 1606, which communicate with each other via a bus 1608. The computer system 1600 may further include a video display unit 1610 (e.g., a LCD or a CRT). The computer system 1600 also includes an alphanumeric input device 1612 (e.g., a keyboard), a User Interface (UI) cursor controller 1611 (e.g., a mouse), a disk drive unit 1616, a signal generation device 1618 (e.g., a speaker) and a network interface device (e.g., a transmitter) 1620.

The disk drive unit 1616 includes a machine-readable medium 1622 on which is stored one or more sets of instructions and data structures (e.g., software) embodying or utilized by any one or more of the methodologies or functions described herein. The software may also reside, completely or at least partially, within the main memory 1601 and/or within the processor 1602 during execution thereof by the computer system 1600, the main memory 1601 and the processor 1602 also constituting machine-readable media.

The instructions 1621 may further be transmitted or received over a network 1626 via the network interface device 1620 utilizing any one of a number of well-known transfer protocols (e.g., HTTP, SIP).

The term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more methodologies described herein. The term "machine-readable medium" shall accordingly be taken to include, but not be limited to, solid-state memories, optical and magnetic medium, and carrier wave signals.

In some embodiments, a system comprising a first server is operatively coupled to a router, to receive a copy of network traffic processed by the router, a database operatively coupled to the first server, wherein the server records parsed network traffic information onto the database, and a device operatively coupled to the first server to receive alerts regarding possible DOS attacks, the alerts based upon network traffic falling outside a SD range. This system may further comprise a second server operatively coupled to the router. Moreover, this system may further include a second server that is a web server. The system may also serve to detect DOS attacks that include, for example, a SYN flood, ICMP flood, UDP flood, distributed attack, or application level flood. Further, the system may also include a device such as, for example, a computer system, cell phone, or PDA.

Some embodiments may additionally include a method including receiving a data packet from a network, parsing the data packet into its respective fields, storing data in the fields of the data packet into a database as an observed data set, comparing observed data set values with a historical data set values, sending an alert to a device based upon network traffic falling outside a SD range, and updating the historical data set values by averaging the observed data set values with an old historical data set values. In addition, this method may further comprise sending the alert where a difference between a value in the observed data set and a value in the historical data set exceeds a SD threshold. Moreover, the method may additionally include sending the alert where a difference between a value in the observed data set and a value in the historical data set is below a SD threshold. Further, the method may include sending an alert where the value in the observed data set exceeds the value in the historical data set by a threshold of 25 SDs. In some embodiments, the method may include sending the alert where the value in the observed data set is below the value in the historical data set by a threshold of six SDs. Moreover, the method may include updating an existing historical SD data set by applying a quantitative forecasting algorithm to the historical SD data set and the observed deviations data set, wherein the quantitative forecasting algorithm is an HW algorithm. Further the method may include utilizing data packets such as a TCP packet, a UDP packet, an IP packet, and an ICMP packet, with one or more of the following fields a TCP flags field, a TCP flag combinations field, an IP protocol number field, an IP TTL field, an IP header checksum, an IP identification number field, an IP fragment bits, an IP fragment offset field, a source IP address field, a destination IP address field, an IP total length field, a TCP sequence number field, a TCP acknowledgement number filed, a TCP window size field, a TCP destination port field, a TCP source port field, a TCP checksum field, a TCP options field, a UDP destination port field, a UDP source port field, a UDP length field, a UDP checksum field, a ICMP type field, a ICMP code field, and a ICMP checksum field. In some embodiments, the method may include parsing one or more of these fields based upon values contained within the fields, or parsing based upon a random distribution of values contained within the fields. The method may further include initializing a parser via an instruction set read from an instruction file, where the instruction file an XML file, text file, or flat file as is known in the art. In some embodiments, the method further comprises displaying in a graphical format existing network traffic. Additionally, the method may further comprise displaying in a graphical format a portion of the existing network traffic that falls outside a SD range. Further, the method where the displaying occurs on a device that includes at least one of a group of device types consisting of a computer system, cell phone, and PDA.

In some embodiments, a computer-readable medium having instructions stored thereon for causing a suitably programmed computer to execute a method including a first instruction set to receive a data packet from a network, a second instruction set to parse the data packet into its respective fields, a third instruction set to store the data in the fields of the data packet into a database as an observed data set, a fourth instruction set to compare the observed data set with a historical data set, a fifth instruction set to send an alert to a device, and a sixth instruction set to update the historical data set by averaging the observed data set with an old historical data set.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details may be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
    a first server operatively coupled to a router, to receive a copy of network traffic processed by the router; the network traffic comprising a plurality of data packets;
    a database operatively coupled to the first server, wherein the first server receives, parses and records network traffic information onto the database, the plurality of data packets parsed based upon a random distribution of values, the random distribution of values used to categorize an observed value contained within an identified field of fields included in respective data packets of the plurality of data packets; and
    a device operatively coupled to the first server to receive alerts regarding possible Denial Of Service (DOS) attacks, the alerts based upon network traffic falling outside a standard deviation range,
    the first server further to update an existing historical standard deviation data set by applying a quantitative forecasting algorithm to the historical standard deviation data set and an observed deviations data set.

2. The system of claim 1, further comprising a second server operatively coupled to the router.

3. The system of claim 2, wherein the second server is a web server.

4. The system of claim 1, wherein a DOS attack includes an attack type selected from the group consisting of a Synchronize (SYN) flood, Internet Control Message Protocol (ICMP) flood, User Datagram Protocol (UDP) flood, distributed attack, and application level flood.

5. The system of claim 1, wherein the device includes a device selected from the group consisting of a computer system, cell phone, and Personal Digital Assistant (PDA).

6. A method comprising:
    receiving, at a router, a copy of a data packet from a network, the data packet sent to a web server via the network;
    parsing the data packet based upon a random distribution of values, the random distribution of values used to categorize an observed value contained within an identified field of fields included in respective data packets of the plurality of data packets;
    storing data in the fields of the data packet into a database as an observed data set;
    comparing observed data set values with a historical data set values;
    sending an alert to a device based upon network traffic falling outside a standard deviation range; and
    generating new historical data set values by averaging the observed data set values with the historical data set values; and
    updating an existing historical standard deviation data set by applying a quantitative forecasting algorithm to a historical standard deviation data set and an observed deviations data set.

7. The method of claim 6, further comprising sending the alert where a difference between a value in the observed data set and a value in the historical data set exceeds a standard deviation threshold.

8. The method of claim 6, further comprising sending the alert where a difference between a value in the observed data set and a value in the historical data set is below a standard deviation threshold.

9. The method of claim 7, wherein the alert is sent where the value in the observed data set exceeds the value in the historical data set by a threshold of 25 standard deviations.

10. The method of claim 8, wherein the alert is sent where the value in the observed data set is below the value in the historical data set by a threshold of 6 standard deviations.

11. The method of claim 6, wherein the quantitative forecasting algorithm is a Holt-Winters (HW) algorithm.

12. The method of claim 6, wherein the data packet includes a data packet selected from the group consisting of a Transmission Control Protocol (TCP) packet, a User Datagram Protocol (UDP) packet, an Internet Protocol (IP) packet, and an Internet Control Message Protocol (ICMP) packet.

13. The method of claim 6, wherein the fields of the data packets includes a field selected from the group consisting of a Transmission Control Protocol (TCP) flags field, a TCP flag combinations field, an Internet Protocol (IP) protocol number field, an IP Time-To-Live (TTL) field, an IP header checksum, an IP identification number field, an IP fragment bits, an IP fragment offset field, a source IP address field, a destination IP address field, an IP total length field, a TCP sequence number field, a TCP acknowledgement number filed, a TCP window size field, a TCP destination port field, a TCP source port field, a TCP checksum field, a TCP options field, a User Datagram Protocol (UDP) destination port field, a UDP source port field, a UDP length field, a UDP checksum field, a ICMP type field, a ICMP code field, and a ICMP checksum field.

14. The method of claim 6, further comprising parsing the fields based upon values contained within the fields.

15. The method of claim 6, further comprising initializing a parser using an instruction set read from an instruction file.

16. The method of claim 15, wherein the instruction file is an Extensible Mark-up Language (XML) file.

17. The method of claim 6, further comprising displaying in a graphical format existing network traffic.

18. The method of claim 6, further comprising displaying in a graphical format a portion of the existing network traffic that falls outside a standard deviation range.

19. The method of claim 18, where the displaying is on a device that includes a device selected from the group consisting of a computer system, cell phone, and Personal Digital Assistant (PDA).

20. A non-transitory computer-readable medium having instructions embodied thereon, the instructions executable by a processor for causing a computer to perform a method comprising:
    receiving, at a router, a copy of a data packet from a network, the data packet sent to a web server via the network;

parsing the data packet based upon a random distribution of values, the random distribution of values used to categorize an observed value contained within an identified field of fields included in respective data packets of the plurality of data packets;
storing the data in the fields of the data packet into a database as an observed data set;
comparing the observed data set with a historical data set;
sending an alert to a device;
generating a new historical data set by averaging the observed data set with the historical data set; and
updating an existing historical standard deviation data set by applying a quantitative forecasting algorithm to the historical standard deviation data set and an observed deviations data set.

* * * * *

UNITED STATES PATENT AND TRADEMARK OFFICE
CERTIFICATE OF CORRECTION

| | | |
|---|---|---|
| PATENT NO. | : 7,992,192 B2 | Page 1 of 1 |
| APPLICATION NO. | : 11/617974 | |
| DATED | : August 2, 2011 | |
| INVENTOR(S) | : Kevin E. Maher et al. | |

It is certified that error appears in the above-identified patent and that said Letters Patent is hereby corrected as shown below:

In column 5, line 15, delete "filed," and insert -- field, --, therefor.

In column 10, line 8, delete "filed," and insert -- field, --, therefor.

In column 14, line 25, delete "filed," and insert -- field, --, therefor.

In column 15, line 25, in Claim 1, delete "router;" and insert -- router, --, therefor.

In column 15, line 28, in Claim 1, delete "parses" and insert -- parses, --, therefor.

In column 15, line 66, in Claim 6, after "with" delete "a".

In column 16, line 39, in Claim 13, delete "filed," and insert -- field, --, therefor.

Signed and Sealed this
Eighteenth Day of October, 2011

David J. Kappos
*Director of the United States Patent and Trademark Office*